United States Patent [19]

O'Rourke

[11] Patent Number: 6,098,073
[45] Date of Patent: Aug. 1, 2000

[54] SYSTEM FOR DESIGNING AND IMPLEMENTING A GRAPHICAL USER INTERFACE

[75] Inventor: Barry O'Rourke, Dublin, Ireland

[73] Assignee: International Business Machines Corporation, Armonk, N.Y.

[21] Appl. No.: 07/880,793

[22] Filed: May 8, 1992

[30] Foreign Application Priority Data

May 31, 1991 [EP] European Pat. Off. ............. 91201312

[51] Int. Cl.$^7$ ........................................ G06F 17/30
[52] U.S. Cl. ............................. 707/104; 345/961
[58] Field of Search .................. 395/600, 500, 395/161, 275, 155, 156

[56] References Cited

U.S. PATENT DOCUMENTS

| | | | |
|---|---|---|---|
| 4,914,568 | 4/1990 | Kodosky et al. | 395/275 |
| 4,943,932 | 7/1990 | Lark et al. | 395/76 |
| 5,041,992 | 8/1991 | Cunningham et al. | 395/135 |
| 5,182,796 | 1/1993 | Shibayama et al. | 395/156 |
| 5,187,788 | 2/1993 | Marmelstein | 395/700 |
| 5,230,063 | 7/1993 | Hoeber et al. | 395/156 |
| 5,261,042 | 11/1993 | Brandt | 395/156 |
| 5,291,587 | 3/1994 | Kodosky et al. | 395/500 |
| 5,301,270 | 4/1994 | Steinberg et al. | 395/161 |
| 5,311,422 | 5/1994 | Loftin et al. | 364/401 |
| 5,327,529 | 7/1994 | Fults et al. | 395/155 |
| 5,335,320 | 8/1994 | Iwata et al. | 395/155 |

OTHER PUBLICATIONS

Proc. Compsac '85, Oct. 9, 1985, IEEE Comp. Soc., Washington, DC, pp. 464–471, Adarsh, K. Arora et al., "An Overview Of The VISE Visual Software Development Environment".

IEEE Software, vol. 7, No. 41, Jul. 1990, Los Alamitos, US, pp. 12–20, Andrew Harbert et al.; "A Graphical Specification System For User–Interface Design".

Computer, vol. 21, No. 11, Nov. 1988, Long Beach, US, pp. 10–25; Charles Rich et al.; The Programmers Apprentice: A Research Overview:.

Cox, Object Oriented Programming, An Evolutionary Approach, Productivity Products International, Sandy Hook CT, 1986 Chapter Nine, pp. 155–199.

*Primary Examiner*—Wayne Amsbury
*Attorney, Agent, or Firm*—Arthur J. Samodovitz

[57] ABSTRACT

A software tool generates computer program code in a message based environment. The programmer interacts with the tools making a number of selections to define the user interface of the computer program. When this is complete the tool analyses the user interface definition and produces a list of all the messages that could be produced by that user interface. On the same display a list of blocks of code from a code library is shown. The programmer selects a message and a block of code to be invoked by that message. If the block of code has any prerequisite requirements, the programmer is prompted to meet them. A message identifier, a pointer to the code block, and any prerequisite data is then stored in a linked list structure. When the connection process has finished, the code for producing the defined user interface is generated and the list of connections is traversed, resulting in output the blocks of code from the library in the correct place for their corresponding messages.

6 Claims, 3 Drawing Sheets

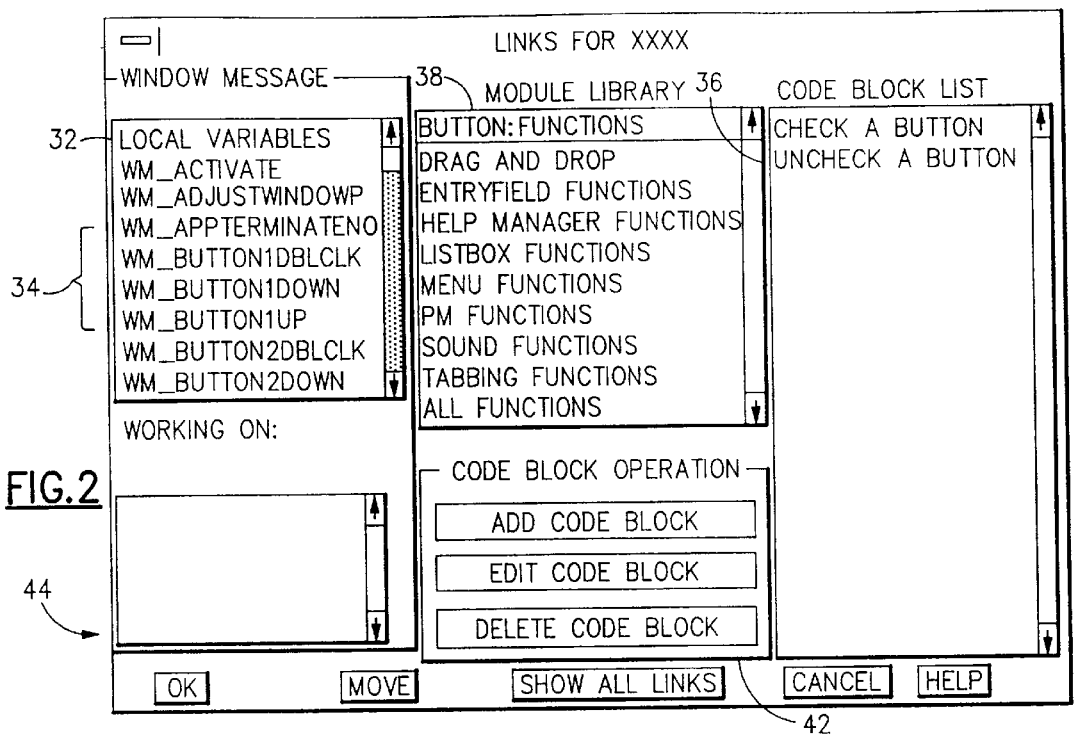

FIG.2

```
MRESULT EXPENTRY DlgProc1(HWND hwnd,USHORT msg,MPARAM mp1,MPARAM mp2)
        /* Window function for window DlgProc1 */
{
   switch( msg )                              /* Window switch              */
   {
      case  WM_COMMAND:                       /* Message Identifier         */
      {
         switch(SHORT1FROMMP( mp1 ))
         {
            case DID_OK:                      /* Reference to Control       */

WinDlgBox(HWND_DESKTOP, hwnd,  /* Code block                 */
               DlgProc3, NULL,                /* Associated with the        */
               ID_SECONDARY_WINDOW,NULL);     /* required message           */
               break;
         }
      }
      break;
      case WM_CONTROL:                        /* Message Identifier         */
      break;
      case WM_INITDLG:                       ./* Message Identifier         */
      break;
      default:
         return(WinDefDlgProc(hwnd,msg,mp1,mp2));
      break;
   }
   return(FALSE);
}
```

FIG.3

SYSTEM FOR DESIGNING AND IMPLEMENTING A GRAPHICAL USER INTERFACE

BACKGROUND OF THE INVENTION

1. Technical Field

The invention relates to the field of software tools for use with data processing apparatus. More particularly, the invention relates to the field of software tools for assisting in the production of the code for computer programs.

2. Description of the Prior Art

The writing of computer programs is a skilled, time consuming, and consequently expensive task. The traditional way of writing computer programs was for a person with a complete and detailed knowledge of the programming language, and the computer the program would run on, to manually write the many hundreds or thousands of line of code that were required. As computer programs become larger and ever more complex the difficulty involved in producing the code increases.

A contributory factor towards this increased complexity has been the adoption of more sophisticated user interfaces, e.g. windowing user interfaces. Whilst such user interfaces make it easier for the user to interact with the program, an increased burden must be carried by the program to support this sophistication. Anything that can ease the writing of computer programs is highly advantageous.

Another trend in computing has been the emergence of computing systems in which the programming flow is handled through a message queue rather than by procedural flow. In procedural flow systems the program follows a predefined path through the code, and will be in a defined state at any given point. In the message queue systems user inputs and other events give rise to messages which are queued and then sent on to the appropriate code for handling them. The precise order in which messages are handled is no longer so dominant, and the approach is better suited to multitasking.

There are several known software tools for assisting in the writing of computer code within a message based environment. One such tool is a program called 'Easel'. With this tool the programmer is able to define the user interface of the program by simple commands defining the size of a window/dialog box, the inclusion of a menu bar, pull down menus, radio buttons etc. Once the programmer has defined what the user interface should look like, the tool could then generate the code for supporting that user interface.

However, merely easing the production of the user interface code is not the complete solution. The user interface code must be operatively connected to the code that carries out the function requested through the user interface, e.g. once you have defined that the computer program you are developing should have a particular button, you must have a further mechanism for defining what should happen when that button is activated. The way the Easel program addresses this problem is to provide its own unique very high level programming language in which the programmer may define how the user interface is to interact with the rest of the program. Once this high level language definition is written, it is compiled to generate lower level code for the program.

This system suffers from the disadvantages that the programmer is required to learn the new high level language and that it is difficult to integrate and custom produce blocks of code into the program in the high level language.

SUMMARY OF THE INVENTION

Viewed from one aspect the invention provides a data processing apparatus having means for generating program code for use in a computer program operating in a message based environment comprising, means responsive to user input for defining features of at least a portion of said computer program, means for displaying a list of messages that could be produced by a feature of said computer program together with a list of blocks of code from a library of blocks of code that may be selected to be invoked in response to said messages, means responsive to user input for building a list of connections between messages and blocks of code to be invoked in response to generation of said messages, means responsive to said defined features and said list of connections for generating said program code.

The invention overcomes the problems associated with the prior art; no new programming language need be learned, and existing code blocks may be easily integrated with the code being generated. Displaying the list of possible messages together with the list of blocks of code makes the system particularly easy to use. The difference in approach from the prior art may be viewed as the prior art seeking to generate the code by working only from a high level downwards, whereas the invention works from a high level downwards to define the user interface and from a low level of the raw messages upwards to define the connections to the code blocks.

In preferred embodiments of the invention groups of blocks of code are associated with a class of functions, and said means for displaying a list of blocks of code acts by displaying a list of classes of functions and, responsive to user selection of a class of functions, displaying a list of said blocks of code associated with said selected class of functions. This feature allows the programmer to more quickly identify for selection the block of code to be connected with a particular message than if they had been required to look through all the possible blocks of code.

Preferred embodiments of the invention further comprise means for adding a block of code to said library of blocks of code. In this way a mechanism for adding custom blocks of code to a program is provided. The block of code is first added to the library and can then be linked into the rest of the program using the list of connections as for a pre-existing block of code. The custom block of code is then also retained in the library from where it might be reused elsewhere.

Another preferred feature of the invention is that said library of blocks of code includes data identifying any prerequisites for each block of code, and said means for building a list of connections reads said data for any selected block of code and tests if said prerequisites are met. In this way the system ensures that the requirements for each code block to execute properly are met before a connection with a message is established, e.g. the use of a code block may require that a particular file be open, or that a form of dialog block for confirming a particular action be predefined. If in response to a resulting prompt the programmer enters data or selects an option that is a prerequisite for that code block, then data for satisfying the prerequisite is recorded in said list of connections for use when generating the program code.

In a particularly preferred embodiment of the invention, said list of connections is a linked list structure containing message identifiers, pointers to blocks of code and data for satisfying prerequisite of said blocks of code.

Viewed from another aspect, the invention provides a method of generating program code for use in a computer program operating in a message based environment comprising the steps of: defining features of at least a portion of said computer program in response to user input, displaying a list of messages that could be produced by a feature of said computer program together with a list of blocks of code from a library of blocks of code that may be selected to be invoked in response to said messages, building, in response to user input, a list of connections between messages and blocks of code to be invoked in response to generation of said messages, and generating said program code using said defined features and said list of connections.

An embodiment of the invention will now be described, by way of example only, with reference to the accompanying drawings.

BRIEF DESCRIPTION OF THE DRAWINGS

FIG. 2 illustrates a display screen of the software tool showing the list of messages and list of blocks of code.

FIG. 3 is a sample of the output code generated by the software tool.

DETAILED DESCRIPTION OF THE PREFERRED EMBODIMENT

Figure 1A:
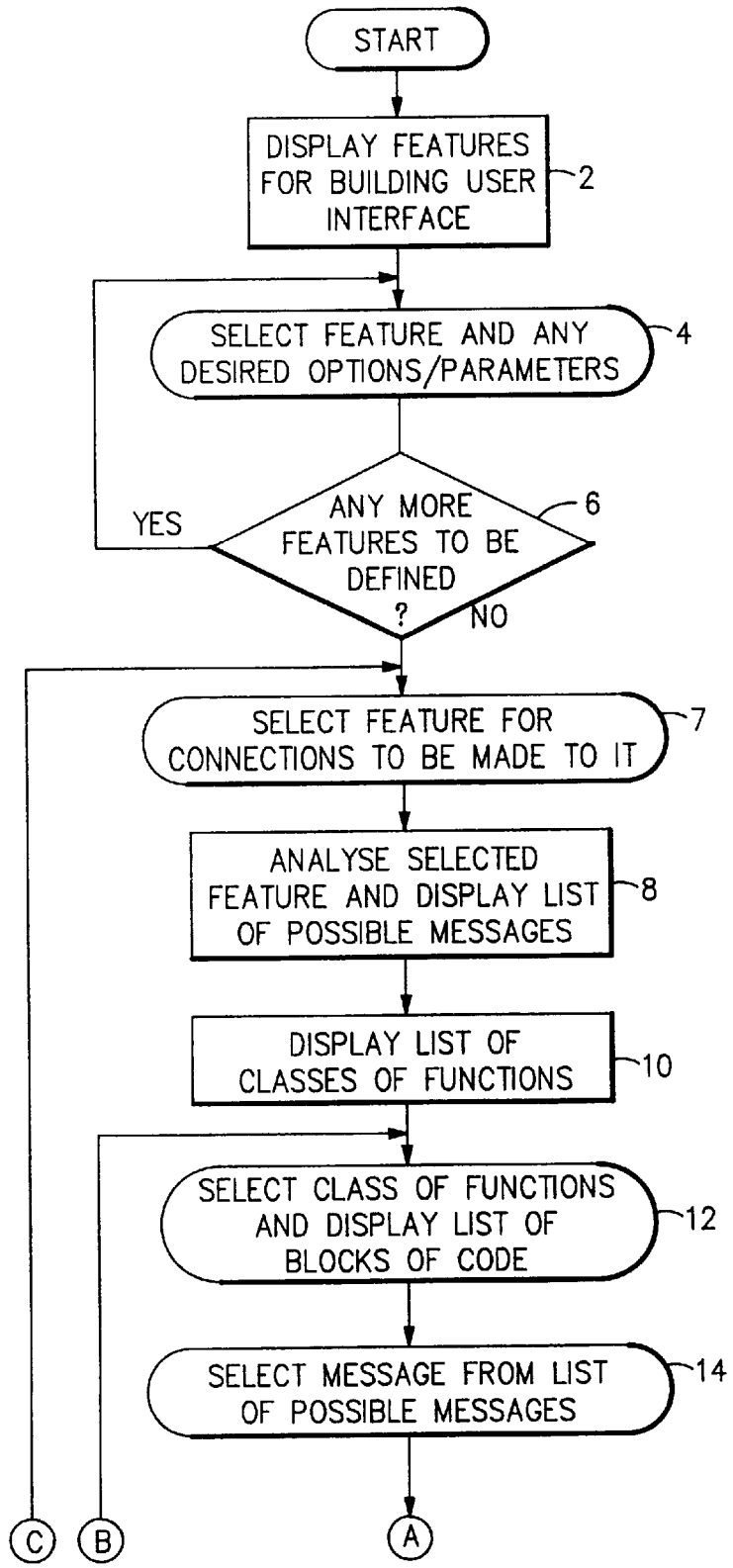
FIGS. 1A and 1B illustrate the operation of the software tool.
Figure 1B:
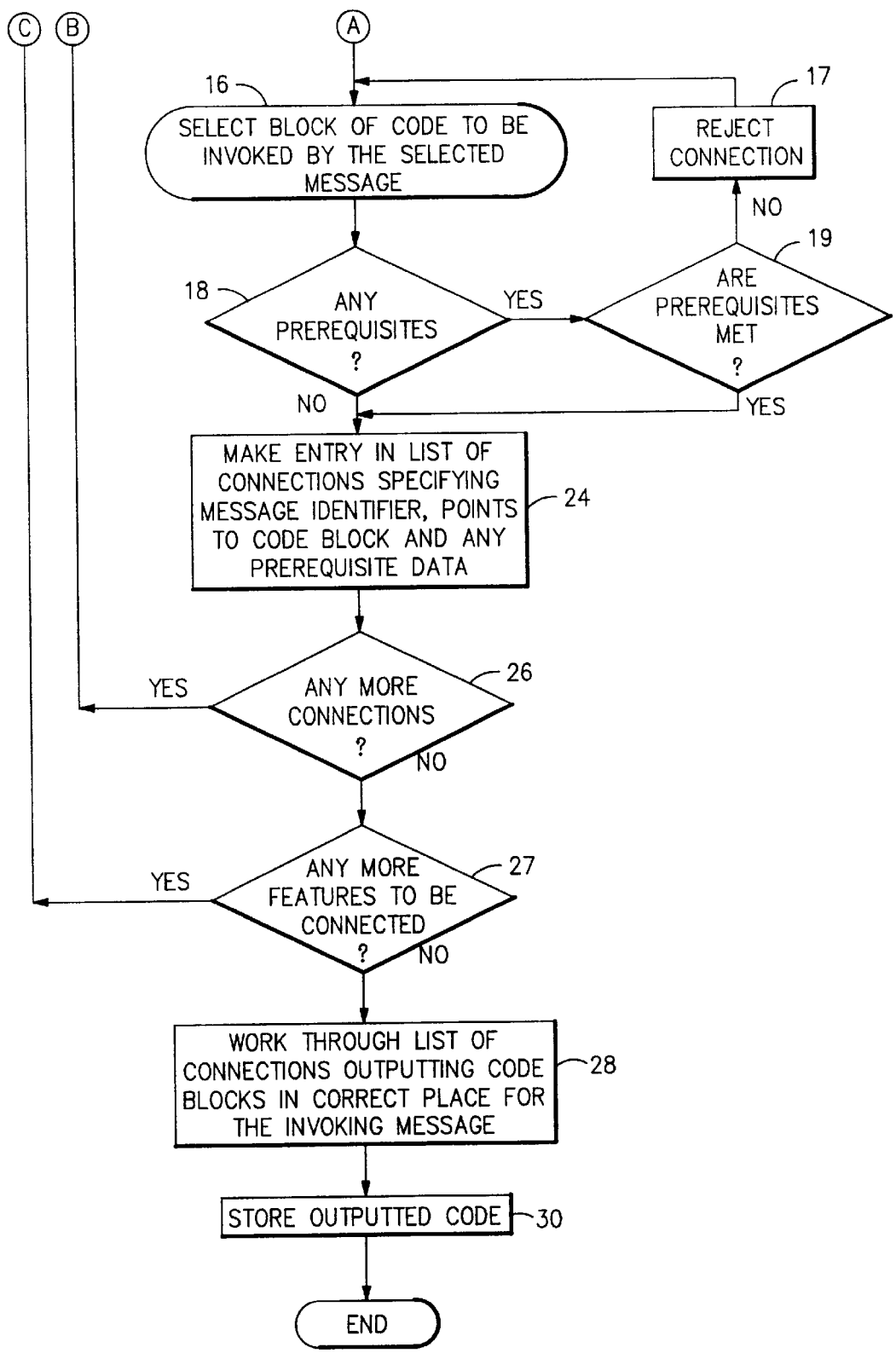

Referring to FIGS. 1A and 1B, the process starts at step 2 with the display of the possible features for building the user interface. Typically the programmer would be presented with a list of options displayed in mixed graphical and text form on one side of the screen whilst the results of the selections already made for the portion of the user interface being worked on would displayed in the other part of the screen.

By interaction with this screen as illustrated by steps 4 and 6 the programmer gradually assembles the definition of the user interface required. When this definition is complete the user then selects a feature to make connections to at step 7, and then the system passes to step 8 at which the selected feature is analyzed to determine the list of possible messages that it could produce. This can be done by cross-referencing a list of messages that can be generated by such a feature.

The message list contains only the relevant messages for the particular feature (window/control etc.) which has been selected. If the currently selected item is a window the the messages relating to windows (WM_****) are added to the list. Accordingly, these messages 34 are added to the list of messages 32 illustrated in FIG. 2.

When all the features of the user interface have been analyzed the complete list of possible messages 32 will have been assembled. The system displays with this the list of blocks of code that are stored in the library and may be connected to the messages. As there are a large number of blocks of code in the library, the display 44 is organized to show a list of classes of blocks of code 38 (step 10) and then a list of the individual block of code 40 for within the selected class. This makes it easier for the programmer to identify the correct block of code out of the library.

At step 12 the programmer selects a class of blocks of code, i.e. button functions 38. The list of the individual blocks of code 40 is then displayed.

At step 14 the programmer selects a message from the list of messages 32, and at step 16 the programmer selects a block of code from the list of blocks of code 40 to be connected to that message.

At step 18 the library entry for the selected block of code is read and any prerequisites for that block of code to function are detected. At step 19 the system tests if the prerequisites are met, and if not then at step 17 the system rejects that connection. In preferred embodiments the system may prompt the programmer to take action/enter data/make selections to satisfy any detected unmet prerequisites.

At step 24 an entry in the list of connections is made for the combination of message/block of code/prerequisite data that has just been specified. The list of connections has a linked list structure.

If the block of code the programmer wishes to connect to a given message is not in the library, then code block operation controls 42 can be used to trigger a switch into a mode allowing entry of a new code block or editing of existing code blocks by the programmer. Once a new/custom code block has been entered it is added to the library for possible future use.

At step 26 the programmer is able to terminate the connection building process for that feature and at step 27 the decision is made whether any more features should go through the process. Code generation takes place at steps 28 and 30. The code generation step 28 operates by outputting the commands necessary to produce the defined user interface read from its definition, and traversing the linked list structure of the list of connections to output the code blocks in the correct place for the corresponding messages.

FIG. 2 shows a display screen 44 for use in the process described above and FIG. 3 illustrates a small sample output of the code generated by the tool of this invention.

It will be appreciated that, although specific embodiments of the invention have been described herein for purposes of illustration, various modifications may be made without departing from the spirit and scope of the invention. Accordingly, the scope of protection of this invention is limited only by the following claims and their equivalents.

I claim:

1. A computer system for designing a graphical user interface and generating a program to implement user selections from said user interface, said system comprising:

means for storing a multiplicity of program code blocks corresponding to respective functions;

means for displaying a multiplicity of graphical features and receiving designer selections of a plurality of said features for inclusion in said user interface;

means for displaying for each of said plurality of features a list of messages for said each feature and displaying for each of the listed messages a list of the functions which are consistent with said each message;

means, responsive to designer selection of one of the listed messages and one of the listed functions for said each feature, for generating a program based on the program code block corresponding to said one function to implement said one function upon user selection of said each feature and displaying said one message in conjunction with said each feature in said user interface; and means for user selecting of features from said user interface.

2. A computer system as set forth in claim 1, further comprising means for displaying a list of classes of said functions, each of said classes comprising a plurality of said functions; and wherein said means for displaying said list of functions responds to designer selection of one of said classes, by displaying a list of said functions within said one class.

3. A computer system as set forth in claim 1, further comprising means for storing data identifying any prerequisites for each of said functions, and wherein said means for generating said program reads said data for any designer selected function, and determines if said prerequisites are met before generating a corresponding program.

4. A method for designing a graphical user interface and generating a program to implement user selections from said user interface, said method comprising the steps of:

storing a multiplicity of program code blocks corresponding to respective functions;

displaying a multiplicity of graphical features and receiving designer selections of a plurality of said features for inclusion in said user interface;

displaying for each of said plurality of features a list of messages for said each feature and displaying for each of the listed messages a list of the functions which are consistent with said each message;

in response to designer selection of one of the listed messages and one of the listed functions for said each feature, generating a program based on the program code block corresponding to said one function to implement said one function upon user selection of said each feature;

displaying said one message in conjunction with said each feature in said user interface; and user selecting of features from said user interface.

5. A method as set forth in claim 4, further comprising the step of displaying a list of classes of said functions, each of said classes comprising a plurality of said functions; and wherein said step of displaying said list of functions is performed after a designer selects one of said classes comprising said list of functions.

6. A method as set forth in claim 4, further comprising the step of storing data identifying any prerequisites for each of said functions, and said step of generating said program comprises the step of reading said data for any designer selected function and determining if said prerequisites are met before generating a corresponding program.

* * * * *